(12) United States Patent
McKenzie et al.

(10) Patent No.: US 6,916,038 B2
(45) Date of Patent: Jul. 12, 2005

(54) VEHICLE SUSPENSION SYSTEM

(75) Inventors: Thomas A. McKenzie, Spring Lake, MI (US); William J. Hicks, Muskegon, MI (US)

(73) Assignee: The Holland Group, Inc., Holland, MI (US)

( * ) Notice: Subject to any disclaimer, the term of this patent is extended or adjusted under 35 U.S.C. 154(b) by 148 days.

(21) Appl. No.: 10/462,318

(22) Filed: Jun. 16, 2003

(65) Prior Publication Data

US 2004/0012171 A1 Jan. 22, 2004

Related U.S. Application Data

(60) Provisional application No. 60/394,823, filed on Jul. 10, 2002.

(51) Int. Cl.[7] .............................................. B60G 5/02
(52) U.S. Cl. ................ 280/683; 280/684; 280/124.116; 280/124.166; 280/124.107
(58) Field of Search .............................. 280/677–679, 280/682–689, 124.116, 124.166, 124.106, 124.107

(56) References Cited

U.S. PATENT DOCUMENTS

| | | | | |
|---|---|---|---|---|
| 2,403,833 A | * | 7/1946 | Daniel | 280/677 |
| 2,493,026 A | * | 1/1950 | Pointer | 280/685 |
| 2,579,556 A | * | 12/1951 | Drong | 280/677 |
| 3,162,465 A | | 12/1964 | Vaugoyeau | |
| 4,120,515 A | * | 10/1978 | Vinton | 280/678 |
| 4,406,479 A | * | 9/1983 | Chalmers | 280/678 |
| 5,228,718 A | | 7/1993 | Kooistra | |
| 6,224,074 B1 | | 5/2001 | Cadden | |

FOREIGN PATENT DOCUMENTS

GB          2 087 321 A    *    5/1982

* cited by examiner

*Primary Examiner*—Ruth Ilan
(74) *Attorney, Agent, or Firm*—Price, Heneveld, Cooper, DeWitt & Litton, LLP

(57) ABSTRACT

A vehicle suspension system includes a pair of equalizing beams, two pairs of axle housings each having a lower portion connected to opposite ends of the equalizing beams, two pairs of linkage arms operably connected to an upper portion of each of the axle housings and with a vehicle frame, and a pair of air cylinders operably connected to the equalizing beams at a point located between the ends of the beams and with the vehicle frame. The system further includes a torsional beam extending between the first and second air cylinders, wherein the torsional beam provides the operable connection between the first cylinder and the point of the first equalizing beam located between the ends of the first equalizing beam, and the operable connection between the second cylinder and the point of the second equalizing beam located between the ends of the second equalizing beam.

17 Claims, 3 Drawing Sheets

VEHICLE SUSPENSION SYSTEM

CROSS-REFERENCE TO RELATED APPLICATION

This application claims the benefit of U.S. Provisional Application No. 60/394,823, filed Jul. 10, 2002, entitled VEHICLE SUSPENSION SYSTEM, which is hereby incorporated herein by reference in its entirety

BACKGROUND OF THE INVENTION

The present invention relates to a vehicle suspension system, and in particular to a heavy duty, walking beam-type suspension system.

A variety of vehicle suspension units have been developed for vehicles that include two or more pairs of drive wheels. These suspension systems include single, tandem and tridem suspension systems, as well as equalizing or walking beam-type systems. Walking beam type systems, as described in more detail below, typically include a plurality of linkage arms cooperating to form a parallelogram, wherein one of the members, an equalizing beam, pivotally connects a pair of associated axles. A suspension unit is then supported between the associated frame of the supported vehicle and a midpoint of each equalizing beam. The suspension units typically include a plurality of leaf springs pivotally connected to the frame at a first end, and slidingly connected to the frame at a second end. Other variations of the walker beam-type suspension systems have included the use of a plurality of air springs as a replacement to the plurality of leaf springs.

Heretofore, these systems have proven inadequate to simultaneously provide acceptable load support and acceptable ride comfort. Specifically, the systems utilizing leaf springs provide adequate load support, however fail to provide sufficient ride comfort. More specifically, while these systems provide sufficient longitudinal roll stability to the associated vehicle frame, the leaf springs within these systems dictate a spring constant that remains consistent regardless of the load being supported. The result is a fixed rate suspension system, thereby creating a relatively rougher ride as the load on the frame is reduced. On the other hand, systems utilizing air cylinders provide adequate ride comfort; however, fail to provide sufficient longitudinal roll stability. Specifically, these systems are inherently variable rate devices, as the pressure within the air cylinders may be changed, thereby allowing the ride comfort to be maximized. However, these systems have failed to provide adequate longitudinal roll stability.

A vehicle suspension system is desired that simultaneously maximizes ride comfort for the operator of the associated vehicle, and maximizes longitudinal roll stability of the frame of the vehicle.

SUMMARY OF THE INVENTION

The present inventive vehicle suspension system provides a tandem axle walking beam suspension with a single point air isolation, thereby allowing simultaneous optimization of longitudinal roll stability and ride comfort.

One aspect of the present invention is to provide a vehicle suspension system that includes a first equalizing beam operably connected to a first pair of axle housings at a first end of each axle housing, the axle housings being operably connected with a vehicle frame, and a first air cylinder operably connected to the first beam at a point located between the ends of the first beam and with the vehicle frame. The vehicle suspension system also includes a second equalizing beam operably connected to a second pair of axle housings at a second end of each axle housing, and a second air cylinder operably connected to the second equalizing beam at a point located between the ends of the second beam and with the vehicle frame. The vehicle suspension system further includes a torsional beam extending between the first air cylinder and the second air cylinder, wherein the torsional beam provides the operable connection between the first air cylinder and the point of the first equalizing beam located between the ends of the first equalizing beam, and the operable connection between the second air cylinder and the point of the second equalizing beam located between the ends of the second equalizing beam.

Another aspect of the present invention is to provide an air cylinder for a heavy duty vehicle suspension system that includes a first plate, a second plate, and a baffle located between and connected to the top plate and the bottom plate and cooperating with the top and the bottom plate to form an interior space, wherein the interior space is adapted to receive an air pressure therein, thereby separating the first plate and the second plate. The air cylinder also includes a bumper member located within the interior space and between the first plate and the second plate, wherein the bumper member holds the first and second plates apart when the air pressure is released from within the interior space.

Yet another aspect of the present invention is to provide a method for controlling the roll stability of a vehicle suspension system that includes providing a vehicle frame, providing a first equalizing beam operably connected to a first pair of axle housings at a first end of each axle housing, and providing a first air cylinder operably connected to the first beam at a point located between the ends of the first beam, wherein the first air cylinder is operably connected with the vehicle frame, and wherein the first air cylinder includes an interior space adapted to receive an air pressure therein. The method also includes providing a second equalizing beam operably connected to a second pair of axle housings at a second end of each axle housing, and providing a second air cylinder operably connected to the second beam at a point located between the ends of the second beam, wherein the second air cylinder is operably connected with the vehicle frame, and wherein the second air cylinder includes an interior space adapted to receive an air pressure therein. The method further includes controlling a longitudinal roll stability of the vehicle frame by adjusting the air pressures within the air interior spaces of the first and second air cylinders.

Still yet another aspect of the present invention is to provide a vehicle that includes a vehicle frame, a first axle having a first end and a second end each operably coupled to a pair of vehicle wheels, respectively, and a second axle having a first end and a second end each operably coupled to a second pair of vehicle wheels, respectively. The vehicle also includes a first equalizing beam, a first pair of axle housings each having a lower portion operably connected to opposite ends of the first equalizing beam, and each housing the first end of the first and second axles, respectively, a pair of first linkage arms operably connected to an upper portion of each first axle housing and operably connected with the vehicle frame, and a first air cylinder operably connected to the first equalizing beam at a point located between the ends of the first equalizing beam, wherein the first air cylinder is operably connected with the vehicle frame. The vehicle further includes a second equalizing beam, a second pair of axle housings each having a lower portion operably connected to opposite ends of the second equalizing beam, and each housing the second end of the first and second axles, respectively, a pair of second linkage arms operably connected to an upper portion of each of the second axle housings and operably connected with the vehicle frame, and a second air cylinder operably connected to the second beam at a point located between the ends of the second equalizing beam, wherein the second air cylinder is operably connected with the vehicle frame. The vehicle further includes a torsional beam extending between the first air cylinder and the second air cylinder, wherein the torsional beam provides the operable connection between the first cylinder and the point of the first equalizing beam located between the ends of the first equalizing beam, and the operable connection between the second cylinder and the point of the second equalizing beam located between the ends of the second equalizing beam. The vehicle still further includes a first rocker arm having a first end and a second end each operably connected to the vehicle frame, at a point located between the ends of the first rocker arm pivotally connected to the point of the first equalizing beam located between the ends of the first equalizing beam, wherein the first rocker arm is operably connected to the first end of the torsional beam, and a second rocker arm having a first end and a second each operably connected to the vehicle frame, and a point located between the ends of the second rocker arm pivotally connected to the point of the second equalizing beam located between the ends of the second equalizing beam, wherein the second rocker arm is operably connected to the second end of the torsional beam.

The present inventive vehicle suspension system and related method provide a more durable, efficient to use, and more economical to manufacture suspension system. The present inventive vehicle suspension system and related air cylinder are capable of a long operating life, and are particularly well adapted for the proposed use. Moreover, the present inventive vehicle suspension system and related method simultaneously maximize longitudinal roll stability of an associated vehicle frame, and the ride comfort to the operator of the associated vehicle.

These and other advantages of the invention will be further understood and appreciated by those skilled in the art by reference to the following written specification, claims and appended drawings.

DETAILED DESCRIPTION OF THE PREFERRED EMBODIMENTS

Figure 3:
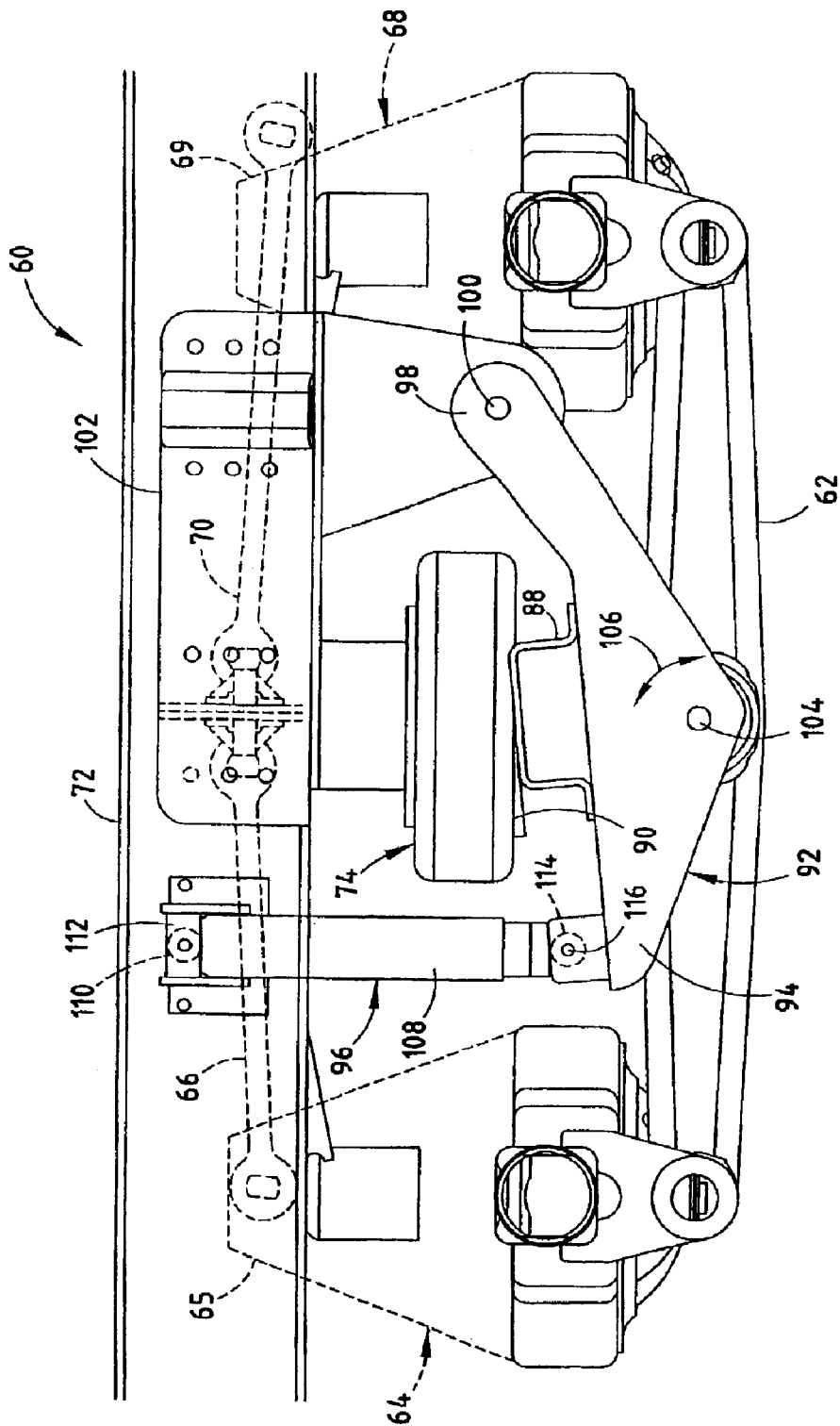
FIG. 3 is a side elevational view of a vehicle suspension assembly embodying the present invention, wherein a plurality of linkage arms are shown in dashed lines.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
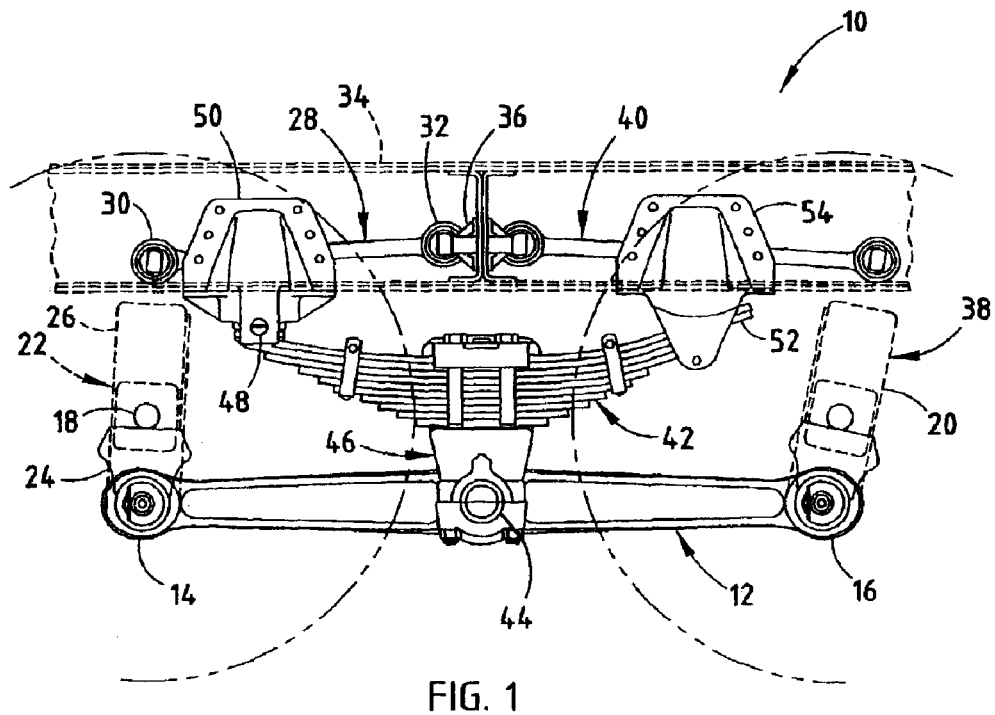
FIG. 1 is a side elevational view of a prior art vehicle suspension system with a portion of a frame shown in dashed lines to show a plurality of linkage arms.
Figure 2:
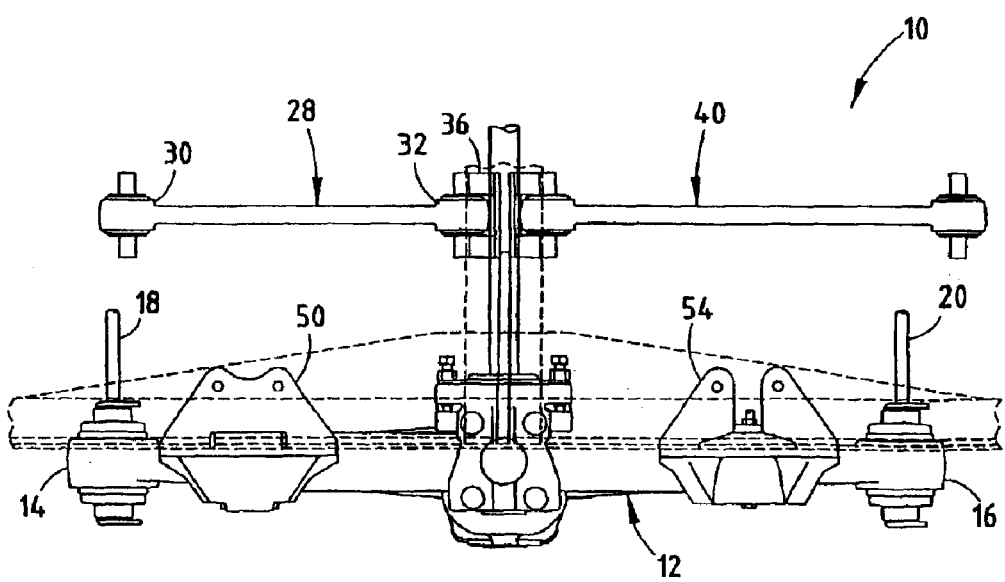
FIG. 2 is a top profile view of the right half of the prior art vehicle suspension system with a portion of the frame shown in dashed lines to show other components of the suspension system.

A prior art vehicle suspension assembly 10 is illustrated in FIGS. 1 and 2. As is consistent throughout this application, only the left side of the suspension assembly 10 is described, as the left and right sides of the suspension assembly 10 are mirror images of one another, and should therefore be considered descriptive of both the left and right sides of the suspension assembly 10. The left side of the suspension assembly 10 includes an equalizing beam 12 having first end 14 and a second end 16. The first end 14 of the equalizing beam 12 is pivotally connected to a first drive axle housing 22, while the second end of the equalizing beam 12 is pivotally connected to a second drive axle housing 38, in a manner as is known in the art. The housings 22 and 38 house a pair of drive axles 18 and 20, respectively. The first axle housing 22 extends substantially horizontal and is operably connected with the first end of the equalizing beam 12 and includes a bottom portion 24 and an upper portion 26. Specifically, the first end 14 of the equalizing beam 12 is pivotally connected with the lower portion 24 of the first housing 22. A first linkage arm 28 extends substantially horizontally and includes a first end 30 pivotally connected with the upper portion 26 of the first axle housing 22, and a second end 32 pivotally attached to an associated vehicle frame 34 via a lateral mounting bracket 36. The second axle housing 38 corresponds to first axle housing 22. The suspension assembly 10 further includes a second linkage arm 40 corresponding to the first linkage arm 28, and that pivotally connects the upper portion of the second axle housing 38 with the vehicle frame 34.

A leaf spring assembly 42 is utilized to support and suspend the vehicle frame 34 from the drive axles 18 and 20. Specifically, the leaf spring assembly 42 is pivotally connected to the equalizing beam 12 at a center pivot bushing 44 of a support assembly 46, as is known in the art. A first end 48 of the leaf spring assembly 42 is pivotally connected to a support hanger bracket 50 extending downwardly from and fixedly attached to the vehicle frame 34. A second end 52 of the leaf spring assembly 42 is slidably connected to a support hanger bracket 54 extending downwardly from and fixedly attached to the vehicle frame 34. As is dictated by the spring constant of the overall leaf spring assembly 42, the support provided to the vehicle frame 34 remains constant regardless of the load being supported, thereby resulting in a significantly rough ride for the operator when the load is decreased if the leaf spring assembly 42 is designed to maximize the supportable load, or an inadequate longitudinal roll stability when the load is maximized if the leaf spring assembly is designed to maximize operator comfort with a minimum load.

The reference numeral 60 (FIG. 3) generally designates a vehicle suspension assembly embodying the present invention. In the illustrated example, the left side of the vehicle suspension assembly 60 includes an equalizing beam 62 pivotally connected to a pair of axle housings 64 and 68 in a manner similar to the prior art suspension assembly 10 described above. The left side of the suspension assembly 60 also includes a first linkage arm 66 and a second linkage arm 70 that operably connect upper portions 65 and 69 of the axle housings 64 and 68, respectively, to the vehicle frame 72 in a similar manner to the first and second linkage arms 28, and 40 as described above with respect to the prior art suspension assembly 10.

Figure 4:
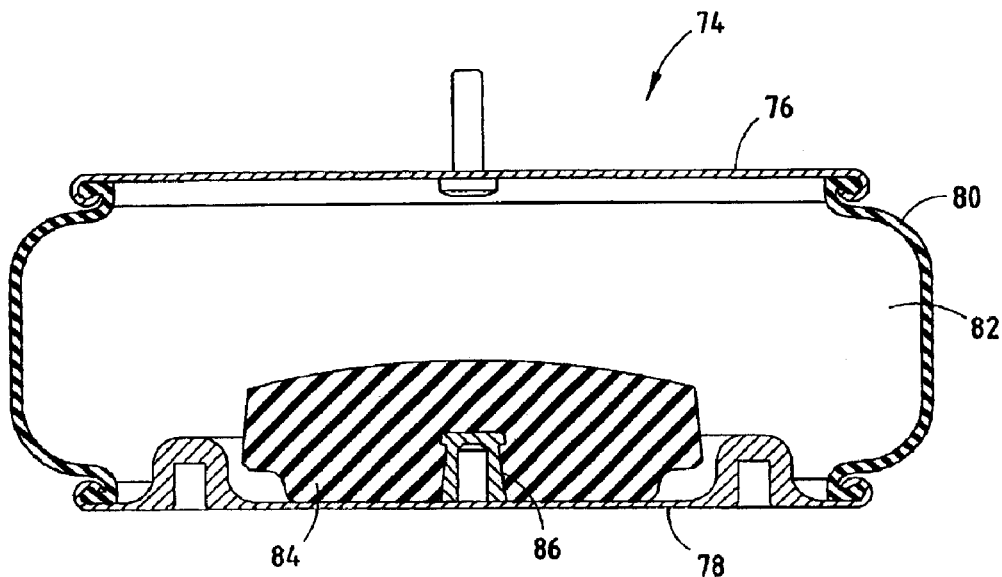
FIG. 4 is a cross-sectional side elevational view of an air cylinder of the vehicle suspension assembly.

The left side of the suspension assembly 60 also includes an air cylinder 74 operably connected to the equalizing beam 62 as described below. As shown in FIG. 4, the air cylinder 74 includes an upper plate 76, a lower plate 78 and a baffle 80 connected to and extending between the upper plate 76 and the lower plate 78, thereby defining an interior space 82 within the air cylinder 74 that is adapted to receive an air pressure therein. The air cylinder 74 also includes a bumper member 84 centrally located on and fixedly attached to the lower plate 78 via hardware 86. During operation, the bumper member 84 supports the full weight of the load if sufficient air pressure is removed from within the interior space 82 such that both the upper plate 76 and the lower plate 78 contact the bumper member 84. The bumper members 84 as disclosed herein are adapted to support the full weight of the load thereon during all times of operation of the associated vehicle without significant degradation thereto. In the illustrated example, the air cylinders 74 provide 34,000 pounds of spring capacity at 100 pounds per square inch internal air pressure, however, air cylinders of other capacities may also be utilized. Moreover, although the illustrated air cylinders 74 include single convoluted cylinders, other cylinder types appropriate for such applications may be utilized.

The air cylinders 74 of the left and right side of the suspension assembly 60 are each supported by a torsional beam 88 (FIG. 5) that extends laterally below the vehicle frame 72. In the illustrated example, the torsional beam 88 is provided with a hat-shaped cross-sectional configuration, however, other geometrical configurations may be utilized therefore. The torsional beam 88 is connected to the lower plate 78 of each air cylinder 74 by a support plate 90 that is fixedly attached to a top surface 91 of the torsional beam.

Figure 5:
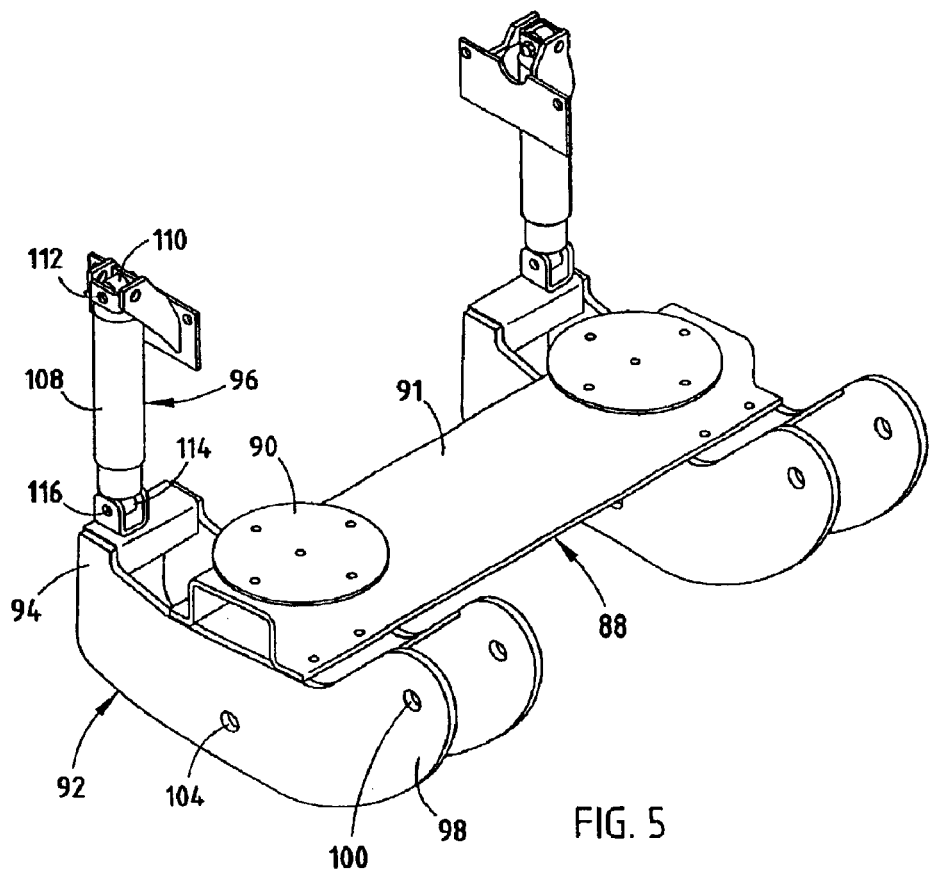
FIG. 5 is a top perspective view of a torsional beam, a pair of rocker arms, and a pair of travel limiting apparati of the vehicle suspension assembly.

The left side of the suspension assembly 60 further includes a rocker arm 92 having a first end 94 operably connected to the vehicle frame 72 via a travel limiting apparatus 96, and a second end 98 pivotally attached at a pivot point 100 to the vehicle frame 72 via a support hanger bracket 102 extending downwardly from and fixedly attached to the vehicle frame 72. The rocker arm 92 is pivotally attached to a midpoint of the equalizing beam 62 at a pivot point 104, thereby allowing the rocker arm 92 to pivot in a direction as indicated by directional arrow 106. The pivotal movement of the rocker arm 92 about the pivot point 104 is limited by the travel limiting apparatus 96. In the illustrated example, the travel limiting apparatus 96 includes a shock absorber 108 having a first end 110 pivotally connected with the vehicle frame 72 at a pivot point 112, and a second end 114 pivotally connected with the first end 94 of the rocker arm 92 at a pivot point 116. Although the illustrated example includes the shock absorber 108, the traveling limiting apparatus may include other devices sufficient for such use. It should be noted that while FIGS. 3 and 5 illustrate first and second alternative embodiments, respectively, for the geometrical shape of the rocker arm 92, other geometrical configurations suitable for such use may be utilized.

In operation, the longitudinal roll stability of the vehicle frame 72 as supplied by the suspension assembly 60 may be adjusted by adjusting the air pressure located within the interior space 82 of each air cylinder 74. The roll stability is further increased by the traversely extending torsional beam 88, that cooperates with the pivot points of the rocker arms 92 and the location of the air cylinder 74 to create a U-shaped anti-roll structure. The total roll stability of the U-shape anti-roll structure is a function of the torsional stiffness of the torsional beam 88, the air pressure within the air cylinders 74 and the overall travel allowed by the travel limiting apparati 96. The amount of air pressure within each of the air cylinders 74 are preferably adjusted based on readings from a height measuring assembly adapted to measure ride height, but may also be adjusted based on other parameters such as vehicle weight and roll rate. The travel limiting apparatus 96 prevents the associated air cylinder 74 from traveling beyond the mechanical travel limits thereof, and provides improved roll resistance by the air cylinders 74 by limiting the reduction in spring stiffness as the load is removed therefrom. The comfort as felt by the operator of the associated vehicle is also significantly increased with the present inventive suspension assembly 60 in that the natural frequency of the suspension assembly 60 is invariable over the entire load range, as compared to the prior art suspension system 10 wherein the natural frequency changes as the load changes. Specifically, the most common vibrational modes for the suspension assembly 60 are "tandem axle bounce" and "single axle tramp." In a fully laden condition, the natural frequency associated with these vibrational modes are significantly lower than those associated with the prior art suspension system 10. As a result, the vehicle suspension assembly 60 may be adjusted to maximize ride comfort for a particular vehicle load.

In the foregoing description, it will be readily appreciated by those skilled in the art that modifications may be made to the invention without departing from the concepts disclosed herein. Such modifications are considered as included in the following claims, unless these claims by their language expressly state otherwise.

What is claimed is :

1. A vehicle suspension system, comprising:
   a first equalizing beam;
   a first pair of axle housings each having a lower portion operably connected to opposite ends of the first equalizing beam;
   a pair of first linkage arms operably connected to an upper portion of each first axle housing and operably connectable with a vehicle frame;
   a first air cylinder operably connected to the first equalizing beam at a point located between the ends of the first equalizing beam, the first air cylinder operably connectable with the vehicle frame;
   a second equalizing beam;
   a second pair of axle housings each having a lower portion operably connected to opposite ends of the second equalizing beam;
   a pair of second linkage arms operably connected to an upper portion of each of the second axle housings and operably connectable with the vehicle frame;
   a second air cylinder operably connected to the second beam at a point located between the ends of the second equalizing beam, the second air cylinder operably connectable with the vehicle frame; and
   a torsional beam extending between the first air cylinder and the second air cylinder, wherein the torsional beam provides the operable connection between the first cylinder and the point of the first equalizing beam located between the ends of the first equalizing beam, and the operable connection between the second cylinder and the point of the second equalizing beam located between the ends of the second equalizing beam.

2. The vehicle suspension system of claim 1, further in including:

a first rocker arm having a first end and a second end each operably connectable to the vehicle frame, and a point located between the ends of the first rocker arm pivotably connected to the point of the first equalizing beam located between the ends of the first equalizing beam, wherein the first rocker arm is operably connected to a first end of the torsional beam; and a second rocker arm having a first end and a second end each operably connectable to the vehicle frame, and a point located between the ends of the second rocker arm pivotably connected to the point of the second equalizing beam located between the ends of the second equalizing beam, wherein the second rocker arm is operably connected to a second end of the torsional beam.

3. The vehicle suspension system of claim 2, wherein the first end of the first rocker arm is operably connectable to the frame via a first travel limiting apparatus that limits a pivoting travel of the first rocker arm about the point located between the ends of the first rocker arm.

4. The vehicle suspension system of claim 3, wherein the first end of the second rocker arm is operably connectable to the frame via a second travel limiting apparatus that limits a pivoting travel of the second rocker arm about the point located between the ends of the second rocker arm.

5. The vehicle suspension system of claim 4, wherein the first travel limiting apparatus includes a first shock absorber.

6. The vehicle suspension system of claim 5, wherein the second travel limiting apparatus includes a second shock absorber.

7. The vehicle suspension system of claim 6, wherein the torsional beam has a hat-shaped cross-sectional configuration.

8. The vehicle suspension system of claim 7, wherein the first and second air cylinders each include a convoluted air cylinder.

9. The vehicle suspension system of claim 8, wherein the first and second air cylinders each include a disk-shaped bumper that extends at least a portion of a vertical height of each cylinder.

10. The vehicle suspension system of claim 2, wherein the first end of the first rocker arm is operably connectable to the frame via a first travel limiting apparatus that limits a pivoting travel of the first rocker arm about the point located between the ends of the first rocker arm, and wherein the first travel limitings apparatus includes a first shock absorber.

11. The vehicle suspension system of claim 1, wherein the torsional beam has a hat-shaped cross-sectional configuration.

12. The vehicle suspension system of claim 1, wherein the first and second air cylinders each include a convoluted air cylinder.

13. The vehicle suspension system of claim 1, wherein the first and second air cylinders each include a disk-shaped bumper that extends at least a portion of a vertical height of each cylinder.

14. The vehicle suspension system of claim 13, wherein the bumper is constructed of a hardened rubber.

15. A vehicle, comprising:

a vehicle frame;

a first axle having a first end and a second end each operably coupled to a first pair of vehicle wheels, respectively;

a second axle having a first end and a second end each operably coupled to a second pair of vehicle wheels, respectively;

a first equalizing beam;

a first of axle housings each having a lower portion operably connected to opposite ends of the first equalixing beam and each housing the first end of the first and second axles, respectively;

a pair of first linkage arms operably connected to an upper portion of each first axle housing and operably connected with the vehicle frame;

a first air cylinder operably connected to the first equalizing beam at a point located between the ends of the first equalizing beam, the first air cylinder operably connected with the vehicle frame;

a second equalizing beam;

a second pair of axle housing each having a lower portion operably connected to opposite ends of the second equalizing beam, and each housing the second end of the first and second axles, respectively;

a pair of second linkage arms operably connected to an upper portion of each of the second axle housing and operably connected with the vehicle frame;

a second air cylinder operably connected to the second beam at a point located between the ends of the second equalizing beam, the second air cylinder operably connected with the vehicle frame;

a torsional beam extending between the first air cylinder and the second air cylinder wherein the torsional beam provides the operable connection between the first cylinder and the point of the first equalizing beam located between the ends of the first equalizing beam, and the operable connection between the second cylinder and the point of the second equalizing beam located between the ends of the second equalizing beam;

a first rocker arm having a first end and a second end each operably connected to the vehicle frame, and a point located between the ends of the first rocker arm pivotably connected to the point of the first equalizing beam located between the ends of the first equalizing beam, wherein the first rocker arm is operably connected to a first end of the torsional beam; and a second rocker arm having a first end and a second end each operably connected to the vehicle frame, and a point locate between the ends of the second rocker arm pivotably connected to the point of the second equalizing beam located between the ends of the second equalizing beam, wherein the second rocker arm is operably connected to a second end of the torsional beam.

16. The vehicle, of claim 15, wherein the first end of the first rocker arm is operably connectable to the frame via a first travel limiting apparatus that limits a pivoting travel of the first rocker arm about the point located between the ends of the first rocker arm.

17. The vehicle suspension of claim 16, wherein the first end of the second rocker arm is operably connectable to the frame via a second travel limiting apparatus that limits a pivoting travel of the second rocker arm about the point located between the ends of the second rocker arm.

* * * * *

UNITED STATES PATENT AND TRADEMARK OFFICE
CERTIFICATE OF CORRECTION

PATENT NO. : 6,916,038 B2
DATED : July 12, 2005
INVENTOR(S) : McKenzie et al.

It is certified that error appears in the above-identified patent and that said Letters Patent is hereby corrected as shown below:

Column 3,
Line 58, "apparati" should be -- apparatus --.

Column 6,
Line 6, "apparati" should be -- apparatus --.
Line 7, "are" should be -- is --.

Column 7,
Line 1, delete "in".
Line 48, "limitings" should be -- limiting --.

Column 8,
Line 10, after "first" insert -- pair --.
Line 22, "housings" should be -- housing --.

Signed and Sealed this

Twenty-ninth Day of November, 2005

JON W. DUDAS
*Director of the United States Patent and Trademark Office*